US008366058B2

(12) United States Patent
Tiedemann, Sr.

(10) Patent No.: US 8,366,058 B2
(45) Date of Patent: Feb. 5, 2013

(54) CORDING RESTRAINING MEANS ATTACHABLE TO A TOOL

(76) Inventor: Joseph M. Tiedemann, Sr., Chesterfield, NJ (US)

( * ) Notice: Subject to any disclaimer, the term of this patent is extended or adjusted under 35 U.S.C. 154(b) by 538 days.

(21) Appl. No.: 12/462,486

(22) Filed: Aug. 4, 2009

(65) Prior Publication Data

US 2011/0030175 A1 Feb. 10, 2011

(51) Int. Cl.
*F16L 3/12* (2006.01)

(52) U.S. Cl. .......... 248/74.3; 248/68.1; 248/309.1; 248/51; 128/DIG. 26; 604/179; 604/180; 224/221; 24/16 PB; 24/16 R

(58) Field of Classification Search .......... 248/52, 248/51, 205.2, 74.3, 309.1, 68.1, 205.3; 24/16 R, 24/16 PB, 464, 298, 198, 200; 604/174, 604/179, 180; 128/DIG. 6; 224/219, 221, 224/267; 174/70 R, 72 R, 72 C, 115, 116; 211/70.6, 85.13, 124, 89.01, 60.1
See application file for complete search history.

(56) References Cited

U.S. PATENT DOCUMENTS

| | | | |
|---|---|---|---|
| 3,090,826 A | 5/1963 | Cochran | |
| 3,809,349 A * | 5/1974 | Baedke | 248/51 |
| 4,088,136 A * | 5/1978 | Hasslinger et al. | 604/179 |
| 4,096,863 A * | 6/1978 | Kaplan et al. | 604/179 |
| 4,182,005 A | 1/1980 | Harrington | |
| 4,195,807 A | 4/1980 | Llauge | |
| 4,333,468 A * | 6/1982 | Geist | 604/180 |
| 4,414,969 A * | 11/1983 | Heyman | 128/878 |
| 4,617,017 A * | 10/1986 | Hubbard et al. | 604/179 |
| 4,700,432 A | 10/1987 | Fennell | |
| 4,759,963 A * | 7/1988 | Uso et al. | 428/100 |
| 4,780,935 A * | 11/1988 | Palombit | 24/16 PB |
| 4,815,172 A | 3/1989 | Ward | |
| 4,893,381 A | 1/1990 | Frankel | |
| 5,019,050 A * | 5/1991 | Lynn et al. | 604/179 |
| 5,024,402 A | 6/1991 | Hamel | |
| 5,031,282 A | 7/1991 | Denaro | |
| 5,093,964 A | 3/1992 | Rowland | |
| D334,530 S | 4/1993 | Rowland | |
| 5,244,523 A * | 9/1993 | Tollini | 156/227 |
| 5,266,401 A * | 11/1993 | Tollini | 428/343 |
| 5,396,684 A | 3/1995 | Yocom | |
| 5,397,639 A * | 3/1995 | Tollini | 428/343 |
| 5,475,900 A | 12/1995 | Tonks | |
| 5,502,877 A | 4/1996 | Yocum | |
| 5,555,607 A | 9/1996 | Parveris | |
| 5,662,133 A * | 9/1997 | Guido, Jr. | 135/119 |
| 5,802,676 A | 9/1998 | Tolan | |
| 5,896,623 A | 4/1999 | Martin | |
| 5,979,851 A | 11/1999 | Purdy | |
| 6,033,251 A | 3/2000 | Cook | |
| 6,076,789 A * | 6/2000 | Jackson | 248/205.2 |
| 6,158,095 A | 12/2000 | Lassiter | |
| 6,176,729 B1 | 1/2001 | Myers | |
| 6,189,187 B1 | 2/2001 | Williams | |
| 6,336,578 B1 | 1/2002 | Maynard | |

(Continued)

*Primary Examiner* — Kimberly Wood
(74) *Attorney, Agent, or Firm* — Sperry, Zoda & Kane

(57) ABSTRACT

An apparatus is disclosed for bundling or securing cording such as common electrical lines extending from various tools such as hand tools or the like. The apparatus includes a base member with a C-shaped clip member attached thereto. A strap is secured to the base member and extends outwardly through a loop to form a cording securement zone to allow cording to extend axially therethrough. The main strap can extend again toward the base member through a cinching slot defined in the C-shaped clip member and is detachably securable with respect to the base to hold the strap in position extending through the cinching slot to bundle the cording extending through the cording securement zone.

17 Claims, 3 Drawing Sheets

U.S. PATENT DOCUMENTS

| | | |
|---|---|---|
| 6,349,904 B1 | 2/2002 | Polad |
| 6,427,290 B1 | 8/2002 | Liu |
| 6,443,762 B1 | 9/2002 | Lessig, III |
| 6,450,982 B1 | 9/2002 | Peterson |
| 6,519,814 B1 | 2/2003 | Mereness |
| 6,523,229 B2 | 2/2003 | Severson |
| 6,532,631 B2 | 3/2003 | Rohaly et al. |
| 6,543,094 B2 | 4/2003 | D'Addario |
| 6,565,537 B2 * | 5/2003 | Tollini ........................ 604/174 |
| 6,581,885 B2 | 6/2003 | Polad |
| 6,588,074 B2 | 7/2003 | Galkiewicz et al. |
| 6,618,910 B1 | 9/2003 | Pontaoe |
| 6,640,393 B2 | 11/2003 | Wendle |
| 6,701,580 B1 | 3/2004 | Bandyopadhyay |
| 6,712,320 B2 | 3/2004 | Rivera |
| 6,740,817 B1 | 5/2004 | Anderson |
| D491,046 S | 6/2004 | Johnson |
| 6,763,554 B1 | 7/2004 | Torrey et al. |
| 6,799,994 B2 | 10/2004 | Burke |
| 6,802,471 B1 | 10/2004 | Gambrell |
| 6,823,566 B2 | 11/2004 | Coffey |
| 6,842,948 B2 | 1/2005 | Smith |
| 6,868,589 B2 | 3/2005 | Borne |
| 6,916,992 B1 | 7/2005 | Ortiz |
| 6,961,979 B2 | 11/2005 | Wendle |
| 6,966,792 B1 | 11/2005 | Willers et al. |
| 6,979,221 B1 | 12/2005 | Hunter |
| 6,994,300 B2 | 2/2006 | Labeirie et al. |
| 7,004,785 B2 | 2/2006 | Melton et al. |
| 7,071,418 B2 | 7/2006 | Brockman et al. |
| 7,077,363 B2 | 7/2006 | Rivera |
| 7,124,975 B2 | 10/2006 | Richardson |
| 7,165,788 B2 | 1/2007 | Smith et al. |
| 7,172,456 B1 | 2/2007 | Nagy |
| 7,185,399 B2 | 3/2007 | Logan |
| 7,219,405 B1 * | 5/2007 | Nevens ........................ 24/464 |
| 7,229,051 B2 | 6/2007 | Mailhot, Jr. |
| 7,234,958 B1 | 6/2007 | Copus |
| 7,237,307 B2 | 7/2007 | Feschuk |
| D548,129 S | 8/2007 | Fineide |
| 7,446,260 B2 | 11/2008 | Hammonds |
| 7,455,546 B1 | 11/2008 | Yoon et al. |
| 7,469,854 B2 | 12/2008 | Richardson |
| D584,132 S | 1/2009 | Judd |
| D587,988 S | 3/2009 | Johansson |

* cited by examiner

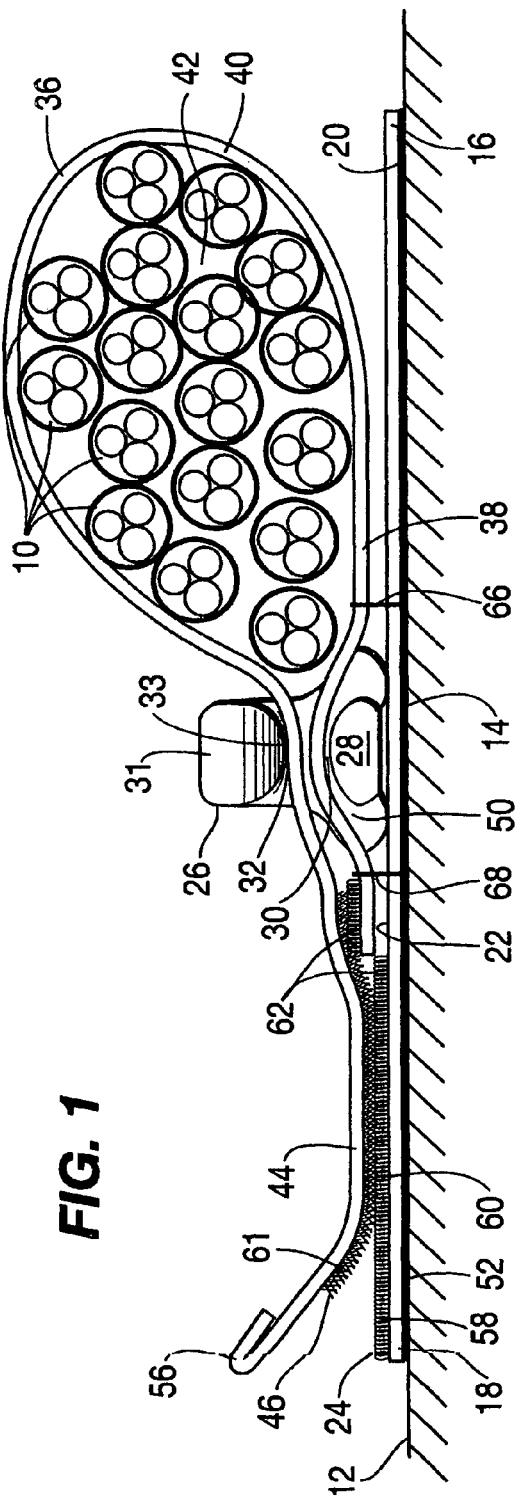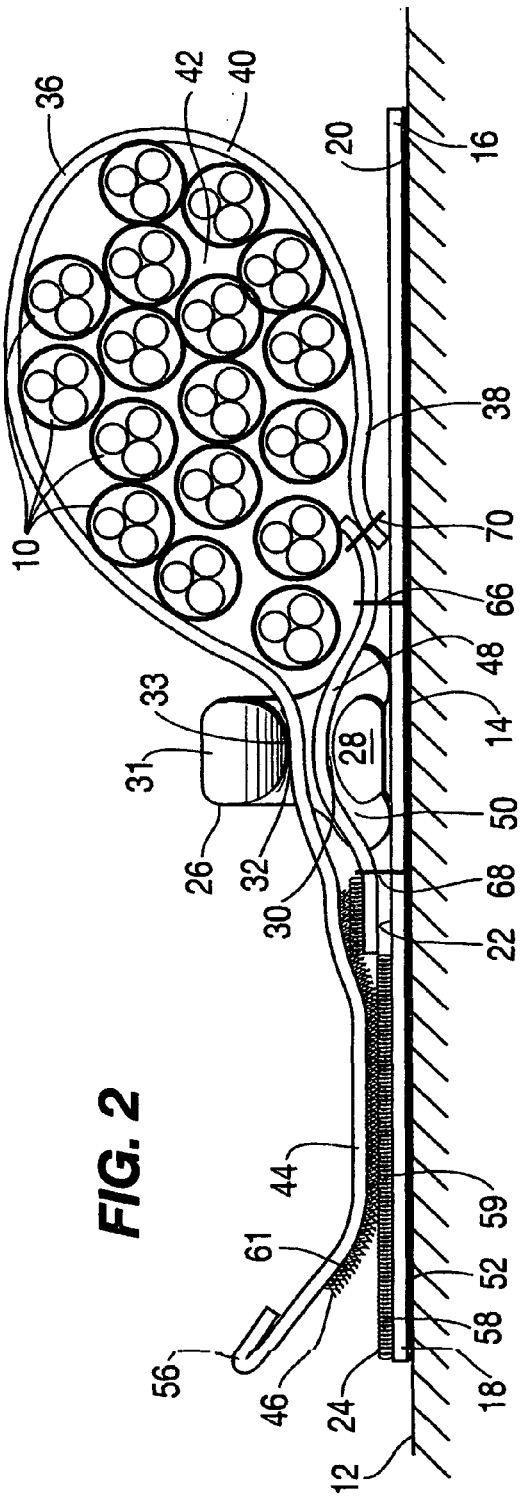

CORDING RESTRAINING MEANS ATTACHABLE TO A TOOL

BACKGROUND OF THE INVENTION

1. Field of the Invention

The present invention deals with the field of devices usable for bundling of line or cord, particularly usable with electrical lines commonly included with electrical hand tools such as drills, sanders, routers and the like. These hand tools include electrical power cords associated therewith which are adapted to be placed in electrical receptacles for the purposes of providing power for operating the tool.

When the tool is not in use, or when the length of cording is greater than needed, excessive cording will exist. This excess cord length can present various problems. As such, the present invention provides a means for gathering and securing such cording in a location immediately adjacent to the tool by a cording restraining or cinching device which itself is attachable to the tool for great convenience.

2. Description of the Prior Art

Many devices have been patented for the purposes of gathering or collecting or otherwise securing cording such as electrical lines with respect to tools such as hand tools and the like such as shown in U.S. Pat. No. 3,090,826 patented May 21, 1963 to C. W. Cochran and assigned to United-Carr Fastener Corporation on a "Wiring Fastener"; and U.S. Pat. No. 4,182,005 patented Jan. 8, 1980 to M. L. Harrington on an "Electrical Cord Holder"; and U.S. Pat. No. 4,195,807 patented Apr. 1, 1980 to J. R. Llauge and assigned to ITW Espana, S.a. on a "Retaining Clip For Elongated Members"; and U.S. Pat. No. 4,700,432 patented Oct. 20, 1987 to M. P. Fennell on a "Bundling Tie"; and U.S. Pat. No. 4,815,172 patented Mar. 28, 1989 to C. G. Ward on a "Fastening Device"; and U.S. Pat. No. 4,893,381 patented Jan. 16, 1990 to E. H. Frankel on a "Bundling Strap With Two Adjustable Closures"; and U.S. Pat. No. 5,024,402 patented to L. F. Hamel on Jun. 18, 1991 on a "Cord Restraint"; and U.S. Pat. No. 5,031,282 patented Jul. 16, 1991 to D. A. Denaro on a "Binding Strap"; and U.S. Pat. No. 5,093,964 patented Mar. 10, 1992 to D. E. Rowland and assigned to Janice L. Rowland on a "Clip For Holding Flexible Elements Such As Wire, Hose, Etc."; and United States Design Pat. No. D334,530 patened Apr. 6, 1993 to D. E. Rowland and assigned to Janice L. Rowland on a "Holder For Flexible Elements, Including Wire, Cords And Rubber Hoses"; and U.S. Pat. No. 5,396,684 patented Mar. 14, 1995 to M. S. Yocom on an "Electrical Utensil Cord-Anchoring Device"; and U.S. Pat. No. 5,475,900 patented Dec. 19, 1995 to P. A. Tonks on a "Cable Holder"; and U.S. Pat. No. 5,502,877 patented Apr. 2, 1996 to M. S. Yocum on an "Electrical Utensil Cord-Anchoring Device"; and U.S. Pat. No. 5,555,607 patented Sep. 17, 1996 to J. J. Parveris on a "Retaining Device"; and U.S. Pat. No. 5,802,676 patented Sep. 8, 1998 to N. J. Tolan and assigned to Velcro Industries B.V. on a "Strap For Securing A Bundled Cord And The Like"; and U.S. Pat. No. 5,896,623 patented Apr. 27, 1999 to M. Martin on a "Reusable Cable Binder"; and U.S. Pat. No. 5,979,851 patented Nov. 9, 1999 to E. G. Purdy on a "Belt Buddy"; and U.S. Pat. No. 6,033,251 patented Mar. 7, 2000 to J. E. Cook on an "Extension Cord Locking Device"; and U.S. Pat. No. 6,158,095 patented Dec. 12, 2000 to J. Lassiter on a "Power Cord Clip"; and U.S. Pat. No. 6,176,729 patented Jan. 23, 2001 to H. R. Myers on a "Cord-To-Cord Restraining Device"; and U.S. Pat. No. 6,189,187 patented Feb. 20, 2001 to J. J. Williams on a "Clip For Holding A Pair Of Elongated Member Portions"; and U.S. Pat. No. 6,336,578 patented Jan. 8, 2002 to B. D. Maynard on a "Wearable Cord Holder"; and U.S. Pat. No. 6,349,904 patented Feb. 26, 2002 to A. A. Polad on a "Cable Bundling And Support Device"; and U.S. Pat. No. 6,427,290 patented Aug. 6, 2002 to C. F. Liu and assigned to Delta Electronics, Inc. on an "Apparatus For Fastening Wire Of Electronic Device"; and U.S. Pat. No. 6,443,762 patented Sep. 3, 2002 to W. R. Lessig, III and assigned to Black & Decker Inc. on a "Power Tool Cord Retainer"; and U.S. Pat. No. 6,450,982 patented Sep. 17, 2002 to L. E. Peterson on a "Cinch Clip For Cast Or Bandage Protector"; and U.S. Pat. No. 6,519,814 patented Feb. 18, 2003 to R. T. Mereness and assigned to Ciena Corporation on a "Glass Fiber Wrap"; and U.S. Pat. No. 6,523,229 patented Feb. 25, 2003 to T. L. Severson on a "Cord Keeper Strap"; and U.S. Pat. No. 6,532,631 patented Mar. 18, 2003 to J. S. Rohaly et al and assigned to Panduit Corp. on a "Four Piece Cable Tie"; and U.S. Pat. No. 6,543,094 patented Apr. 8, 2003 to J. D'Addario and assigned to J. D'Addario & Co., Inc. on a "Cable Management Tie Wrap"; and U.S. Pat. No. 581,885 patented Jun. 24, 2003 to A. A Polad on a "Cable Bundling And Support Device"; and U.S. Pat. No. 6,588,074 patented Jul. 8, 2003 to R. K. Galkiewicz et al and assigned to 3M Innovative Properties Company on a "Self-Mating Reclosable Binding Strap And Fastener"; and U.S. Pat. No. 6,618,910 patented Sep. 16, 2003 to J. S. Pontaoe and assigned to Illinois Tool Works Inc. on a "Cord Clamp"; and U.S. Pat. No. 6,640,393 patented Nov. 4, 2003 to T. B. Wendle on a "Releasable Tie"; and U.S. Pat. No. 6,701,580 patented Mar. 9, 2004 to P. K. Bandyopadhyay and assigned to 3M Innovative Properties Company on an "Interlocking Fastener Including Adhesive Portions"; and U.S. Pat. No. 6,712,320 patented Mar. 30, 2004 to A. F. Rivera on a "Single-Handed Cord/Cable Management Device"; and U.S. Pat. No. 6,740,817 patented May 25, 2004 to R. Anderson on an "Apparatus And Method To Contain A Cord"; and United States Design Pat. No. D491,046 patented Jun. 8, 2004 to D. L. Johnson on a "Wire Wrap"; and U.S. Pat. No. 6,763,554 patented Jul. 20, 2004 to R. H. Torrey et al on a "Self-Engaging Strap-Form Tie With Special Tab"; and U.S. Pat. No. 6,799,994 patented Oct. 5, 2004 to P. C. Burke and assigned to Te3lefonix, Inc. on a "Cord Management Apparatus And Method"; and U.S. Pat. No. 6,802,471 patented Oct. 12, 2004 to M. G. Gambrell on a "Cord-Attached Wrap-Up Device"; and U.S. Pat. No. 6,823,566 patented Nov. 30, 220204 to L. D. Coffey on a "Releasable Retaining Clip Apparatus And Method"; and U.S. Pat. No. 6,842,948 patented Jan. 18, 2005 to K. Smith and assigned to Alliance Rubber Company on a "Rubber And Retainer Apparatus"; and U.S. Pat. No. 6,868,589 patented Mar. 22, 2005 to L. E. Borne on an "Electrical Cord Anchoring Apparatus"; and U.S. Pat. No. 6,916,992 patented Jul. 12, 2005 to J. Ortiz on a "Cord Organizing Sheath Assembly"; and U.S. Pat. No. 6,961,979 patented Nov. 8, 2005 to T. B. Wendle on a "Bundling Tie"; and U.S. Pat. No. 6,966,792 patented Nov. 22, 2005 to A. G. Willers et al and assigned to Computer Network Technology Corp. on a "Method And Apparatus For Retaining A Detachable Cord"; and U.S. Pat. No. 6,979,221 patented Dec. 27, 2005 to A. G. Hunter on a "Retainer For Securing Two Connected Electrical Cords"; and U.S. Pat. No. 6,994,300 patented Feb. 7, 2006 to J. L. Labeirle et al and assigned to Airbus France on a "Device For Fastening Elongate Objects Onto A Flat Support"; and U.S. Pat. No. 7,004,785 patented Feb. 28, 2006 to S. A. Melton et al and assigned to Wahl Clipper Corporation on a "Cord Wrap For Clippers"; and U.S. Pat. No. 7,071,418 patented Jul. 4, 2006 to D. C. Brockman et al. and assigned to Actuant Corporation on a "Cable Holder"; and U.S. Pat. No. 7,077,363 patented Jul. 18, 2006 to A. F. Rivera and assigned to Alexander F. Rivers on a "Single-Handed Cord/Cable Management Device"; and U.S. Pat. No. 7,124,975 patented Oct. 24, 2006 to R. Richardson on a "Cord Organizer And Method Of Using The Same"; and U.S. Pat. No. 7,165,788 patented Jan. 23, 2007 to C. M. Smith et al on a "Binding Wrapper"; and U.S. Pat. No. 7,172,456 patented Feb. 6, 2007 to J. Nagy on an "Electric Cable Organizing Apparatus"; and U.S. Pat. No. 7,185,399 patented Mar. 6, 2007 to M. Logan and assigned to Medcount Systems, C.L.C. on a "Method And Apparatus For Securing Cables And The Like"; and U.S. Pat. No. 7,229,051 patented Jun. 12, 2007 to R. Mailhot, Jr. on a "Support Device For Guidewires And Catheters And Method Of Use Thereof"; and U.S. Pat. No. 7,234,958 patented Jun. 26, 2007 to C. R. Copus and assigned to NCR Corporation on a "Cable Retention Apparatus; and U.S. Pat. No. 7,237,307 patented Jul. 3, 2007 to J. P. Feschuk on a "Slip Grip Device"; and U.S. Pat. No. 7,446,260 patented Nov. 4, 2008 to J. Hammonds on a "Cord, Cable, And Tubing Organizer"; and U.S. Pat. No. 7,455,546 patented Nov. 25, 2008 to S. Yoon et al and assigned to Unisys Corporation on an "Electrical Power Strip Plug Retention"; and U.S. Pat. No. 7,469,854 patented Dec. 30, 2008 to R. Richardson on a "Cord Organizer"; and United States Design Pat. No. D548,129 patented Aug. 7, 2007 to K. G. Fineide on a "Flexible Band"; and United States Design Pat. No. D584,132 patented Jan. 6, 2009 to B. T. Judd and assigned to Brian T. Judd on a "Cable Organizer"; and United States Design Pat. No. D587,988 patented Mar. 10, 2009 to B. Johansson on a "Cord Lock"; and United States Design Pat. No. D587,989 patented Mar. 10, 2009 to B. Johansson on a "Cord Lock".

SUMMARY OF THE INVENTION

The present invention discloses a cord restraining device which is attachable to a tool and comprises a base member attachable to the tool which includes a first base end and a second base end oppositely positioned from one another. A base mounting surface is positionable in abutment with a tool to which the base member is attached to facilitate attachment thereto and a base restraining surface will face away from the base mounting surface to facilitate restraining of cording at a position outwardly therefrom. A base engaging means is mounted upon the base restraining surface at a position adjacent to the second base end thereof.

A C-shaped clip member is included having a lower leg member attached with respect to the base member at a position between the first base end and the second base end thereof to facilitate attachment of the C-shaped clip member with respect to a tool responsive to securement of said base member with respect to a tool. Thus, securement of the base to the tool will automatically also secure the C-shaped clip member with respect to the tool. The C-shaped clip member further includes a spacing member secured to the lower leg member and extending outwardly away therefrom. An upper leg member is secured to the spacing member at a position spatially disposed from the lower leg member to define therebetween a cinching slot.

The cord restraining means further includes a main strap secured with respect to the base member adjacent the first base end thereof and positionable extending outwardly away therefrom which then can return to be positionable extending through the cinching slot defined within the C-shaped clip member. This main strap preferably includes a first strap attaching section attached with respect to the base member adjacent the first base end. The main strap also preferably includes a cord encircling section which extends outwardly away from the first base attaching section in order to facilitate extending around the cording for restraining thereof and being extendable further through the cinching slot. The cord encircling section of the main strap and the base member and the C-shaped slot member each when acting together define a cording securement zone therebetween which facilitates retaining of cording extending therethrough responsive to positioning of the cord encircling section of the main strap at a position extending through the cinching slot. The main strap further will include a second strap attaching section secured to the cord encircling section at a position located oppositely thereon from the first attaching section. Furthermore the main strap will preferably also include a strap engaging means mounted upon the second strap attaching section which is detachably securable with respect to the base engaging means on the base member adjacent the second base end thereof in order to facilitate detachable securing of the main strap with respect to the second base end of the base member in position extending through the cinching slot means while extending around and restraining cording extending through the cording securement zone.

Preferably the main strap will be secured with respect to the base member and will extend to a position adjacent to the second base member for securement therewith. This main strap preferably is at least partially spatially disposed from the base member between the first base end and the second base end in order to define a base pocket therebetween. This base pocket is adapted to receive the lower leg of the C-shaped clip member positioned extending therethrough in order to facilitate attachment thereof with respect to the base member at a position between the first base end and the second base end.

In an alternative configuration the apparatus of the present invention can include a base covering flap extending over the base member and secured to the first base end and second base end thereof. In this configuration the base covering flap will be at least partially spatially disposed from the base member to define a base pocket therebetween which is adapted to receive the lower leg of the C-shaped clip member positioned extending therethrough. Preferably the base covering flap is made of a flexible material.

Attachment of the base of the member of the present invention with respect to a tool can be enhanced by the inclusion of some type of an adhesive such as a glue or welding material or a peel and stick-type of adhesive.

In the preferred configuration the upper leg member of the present invention will extend approximately parallel with respect to the lower leg member and be spatially disposed therefrom in order to define the cinching slot therebetween which has a generally rectangular cross-sectional shape. Also preferably the main strap of the present invention will include a handle in the form of a hem end portion of the flexible main strap to facilitate guiding thereof into the cinching slot and to facilitate tightening of the main strap around the cording positioned within the cording securement zone. Securement of the base engaging means with respect to the strap engaging means is particularly enhanced by the inclusion of a hook and loop securement means at both locations. The base engaging means can be a hook or loop securement means and the strap engaging means would then be the other configuration. That is, when the base engaging means is a base hooking means then the strap engaging means will be a strap looping means. On the other hand, when the base engaging means is a loop securement means then the strap engaging means will be a hook engaging means.

It is an object of the present invention to provide a cording restraining means which is attachable with respect to various different types of tools including hand tools.

It is an object of the present invention to provide a cording restraining means which is of minimal cost.

It is an object of the present invention to provide a cording restraining means which can retain cords of various different sizes and types.

It is an object of the present invention to provide a cording restraining means which is easy and convenient to use.

It is an object of the present invention to provide a cording restraining means which includes no moving parts.

It is an object of the present invention to provide a cording restraining means which is easy to attach and detach conveniently when needed for storage or usage.

It is an object of the present invention to provide a cording restraining means which can be easily maintained and particularly easily cleaned or washed.

It is an object of the present invention to provide a cording restraining means which is made of commonly available materials such as thermoplastics and hook and loop fastening devices.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side cross-sectional view of an embodiment of the cording restraining means attachable to a tool of the present invention shown bundling cording;

FIG. 2 is a side cross-sectional view of an alternative embodiment of the cording restraining means of the present invention shown attached to a tool and bundling cording;

DETAILED DESCRIPTION OF THE PREFERRED EMBODIMENT

Figure 3:
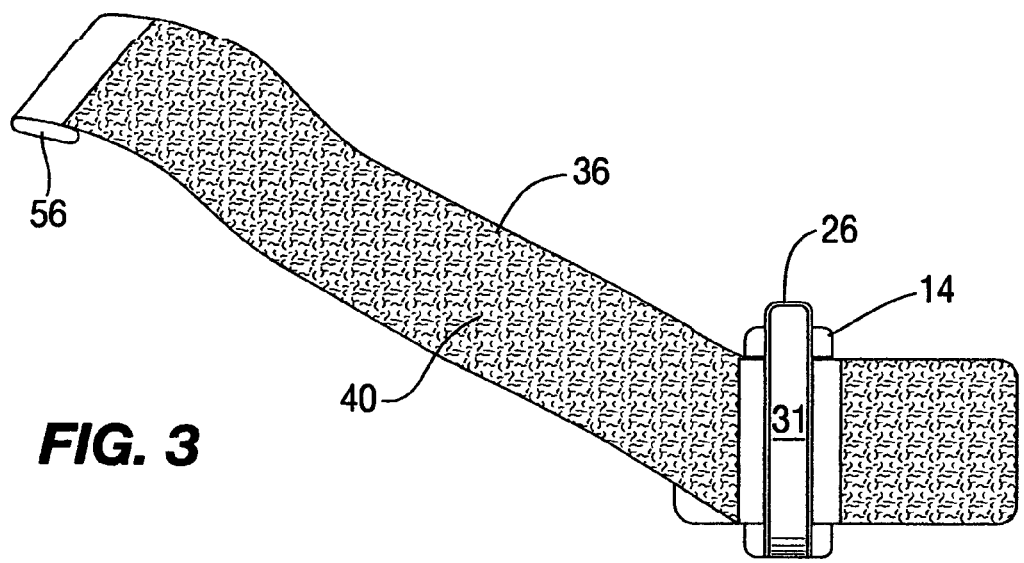
FIG. 3 is a top plan view of an embodiment of the cording restraining means of the present invention.

The present invention provides a cording restraining means which is attachable to a tool 12 for retaining of cording 10 or electrical cording often associated with such tools or hand tools 12. Such tools can include conventional hand tools such as saws, sanders, chills and the like. The present invention provides a unique means for bundling of the electrical cording 10 and detachably fastening thereof after gathering thereof with respect to the body of the tool 12. The construction of the restraining means of the present invention includes a base member 14 which defines a first base end 16 and an oppositely positioned second base end 18.

A base mounting surface 20 is adapted to be attached directly to the tool 12. A base restraining surface 22 faces away from the tool 12 and away from the base mounting surface 20 to facilitate gathering of cording 10 thereadjacent. In the preferred configuration the base mounting surface 20 will include an adhesive means 52 thereon to facilitate securement thereof directly with respect to a tool 12. Such adhesive means 52 can include various materials such as glue or weld material or can include a peel and stick adhesive coating thereover.

Figure 7:
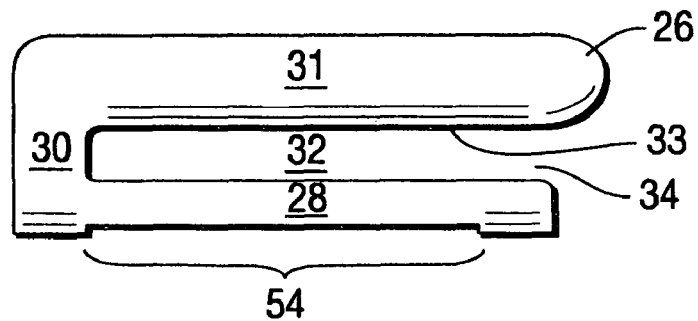
FIG. 7 is a front plan view of an embodiment of the C-shaped clip member of the present invention.

A C-shaped clip member 26 is secured with respect to the base member 14 and is adapted to receive a main strap means 36 extending therethrough to facilitate gathering of the cording 10. The C-shaped clip member 26 preferably includes a lower leg member 28 which is attached with respect to the base member 14 as well as a spacing member 30 secured with respect to the lower leg member 28 and extending outwardly away therefrom. An upper leg member 31 is secured to the spacing member and extends away therefrom in a direction approximately parallel to the lower leg member 28. In this manner the lower leg member 28 will be spatially disposed at a predefined distance from the upper leg member 31 and will extend generally parallel with respect thereto. With this construction the C-shaped clip member 26 will define a cinching slot 32 between the lower leg member 28 and the upper leg member 31 which is adapted to receive the main strap means 36 thereinto to facilitate cinching and securing of the cording 10. Preferably the C-shaped clip member 26 also includes a lateral opening means 34 therein which comprises the outermost portion of the cinching slot 32 as best shown in FIG. 7.

The C-shaped clip member 26 is preferably flexibly resilient to facilitate ease of entry of said main strap means 36 into said cinching slot means 32 and to facilitate cinching retaining of it therewithin while it is positioned extending around said cording 10 extending through said cording securement zone means 42.

The main strap means 36 of the present invention is preferably of a flexible or flexibly resilient material and is adapted to extend around a bundling of cording 10 for restraining and holding thereof. The main strap 36 includes a first strap attaching section 38 normally positioned adjacent one end thereof which is attached with respect to the base member 14 and extends outwardly away therefrom. The main strap 36 then defines a cord encircling section 40 immediately adjacent to the first strap attaching section 38 and this cord encircling section 40 is capable of extending through a generally arcuate path around bundled cording 10 for retaining thereof and defining a cording securement zone means 42 extending therethrough.

A second strap attaching section 44 is preferably defined on the main strap 36 at a point generally oppositely from the first strap attaching section 38 with the cord encircling section 40 positioned therebetween. This second strap attaching section includes a strap engaging means 46 which is adapted to engage a base engaging means 24 defined on the base restraining surface 22 at a location adjacent to the second base end 18 thereof.

As such, the configuration of the main strap means 36 includes the first strap attaching section 38 secured to the base member 14 adjacent the first base end 16 thereof with a cord encircling section 40 extending outwardly in an arcuate path to define the cording securement zone 42 and terminating with a second strap attaching section 44 adapted having a strap engaging means 46 thereon adapted to engage the base engaging means 24 on the base restraining surface 22 adjacent to the second base end 18 thereof. This overall arcuate path of the main strap means 36 enhances the capability of bundling or restraining cording 10 due to the flexible material from which the main strap means 36 is preferably formed.

Thus, with the main strap 36 secured to the base member 14 adjacent the first base end 16 thereof and passing through the cinching slot 32 of the C-shaped clip member 26 and detachably secured with respect to the second base end 18 of the base member 14, a means is provided for restraining of cording 10 immediately thereadjacent. Preferably this bundled cording 10 shown by a plurality of individual cording elements in FIGS. 1 and 2 can be tightly and detachably retained within the cording securement zone 42. This cording securement zone 42 is actually defined by the main strap 36 and particularly the cord encircling section 40 thereof along with the C-shaped clip member 26 and the base member 14. These three elements combine to define the zone 42 within which the cording can be detachably secured.

There are two preferred configurations of the present invention set forth in FIGS. 1 and 2. In the configuration set forth in FIG. 1 the first strap attaching section 38 of the main strap 36 will be secured to the base member 14 adjacent the first base end 16 thereof by various means and, as shown in FIG. 1, by utilizing a first base end stitching 66. The stitching will maintain the engagement between the first strap attaching section 38 and the first base end 16.

The first strap attaching section 38 of the mains trap 36 will extend through the lower portion of the cinching slot 32 and will be secured on the opposite side thereof by way of a second base end stitching 68 with respect to the second base end 18 of the base member 14. With this construction a base pocket means 50 will be defined between the first strap attaching section 38 of main strap 36 and the central portion of the base member 14. This pocket is adapted to receive the lower leg member 28 of the C-shaped clip member 26 positioned thereof for retaining thereof with respect to the base member 14. With this above-described embodiment the first strap attaching section 38 of the main strap 36 will extend further along the second base end 18 and will include defined thereon the base engaging means 24 which is adapted to attach the second strap attaching section 44 of the main strap means 36 with respect to the second base end 18 of the base member 14. This attachment caused by the second base end stitching 68 secures the second strap attaching section 44 of the main strap means 36 with respect to the second base end 18 of base member 14. As such, detachable securement between the strap engaging means 46 of the second strap attaching section 44 and the base engaging means 24 facing upwardly on the first strap attaching section 38 of the main strap means 36 will cause the second strap attaching section 44 of the main strap 36 to be detachably secured with respect to the second base end 18 of the base member 14 for facilitating retaining of cording 10 within the cording securement zone 42.

An alternative configuration is shown in the construction in FIG. 2. FIG. 2 includes a base covering flap means 48 preferably formed of a flexible material which is secured with respect to the first base end 16 of the base member 14 by first base end stitching 66. The base covering flap 48 is also secured with respect to the second base end 18 by the second base end stitching 68. The portion of the base covering flap 48 positioned between the first base end stitching 66 and the second base end stitching 68 will preferably be positioned spatially distant from the base member 14 in such a manner as to define a base pocket 50 therebetween. This base pocket 50 is defined to receive the lower leg member 28 of the C-shaped clip member 26 retained therewithin for holding of the clip member 26 with respect to the base member 14 and with respect to the tool 12 when the apparatus of the present invention is mounted to a tool and ready for usage. With this configuration the base covering flap 48 will include the base engaging means 24 positioned thereon. Preferably this base engaging means 24 comprises a hook and loop fastening member. The strap engaging means 46 of the second strap attaching section 44 of the main strap 36 is preferably detachably securable with respect to the base engaging means 24 defined on and facing upwardly preferably from the base covering flap 48 to facilitate detachable securement of the main strap 36 after it extends through the cinching slot 32 of the clip member 26 for locking thereof in position for retaining of cording 10 within the cording securement zone 42. With this construction as shown in FIG. 2 the first strap attaching section 38 of the main strap means 36 can be attached directly to the base covering flap 48 such as by base covering flap stitching 70. Stitching 70 attaches the first strap attaching section 38 of the main strap 36 with respect to the first base end 16 of the base member 14 since the first base end stitching 66 attaches the base covering flap 48 directly with respect to the first base end 16 of the base member 14. In this manner the cording securement zone 42 is totally enclosed and defined by the base member 14 and the main strap means 36 and the C-shaped clip member 26 for facilitating restraining and holding of cording 10 therewithin.

An important aspect of the present invention is in the use of hook and loop fastening means for facilitating detachable securement of the strap engaging means 46 with respect to the base engaging means 24.

In the preferred configuration the base engaging means 24 will comprise a base hook and loop securement means 58 and the strap engaging means 46 will comprise a strap hook and loop securement means 61. Thus and more specifically the base engaging means 24 can comprise a base hook securement means 59 or a base loop securement means 60. If the base engaging means 24 comprises a base hook securement means 59 then the strap engaging means 46 will comprise a strap loop securement means 64. On the other hand, if the base engaging means 24 comprises a base loop securement means 60 then the strap engaging means 46 will comprise a strap hook securement means 62. In accordance with the present invention this engaging means can comprise any configuration. However, a hook and loop configuration is preferred and when such a hook and loop configuration is preferred then the base engaging means 24 and the strap engaging means 46 must be either a hook or loop and the opposite engaging means must be of the opposite configuration. Thus, if base engaging means 24 is of a hook configuration then the strap engaging means 46 must be a loop configuration, whereas if base engaging means 24 is of a loop configuration then the strap engaging means 46 must be of a hook configuration. Any of these configurations are within contemplation of the present invention.

Figure 8:
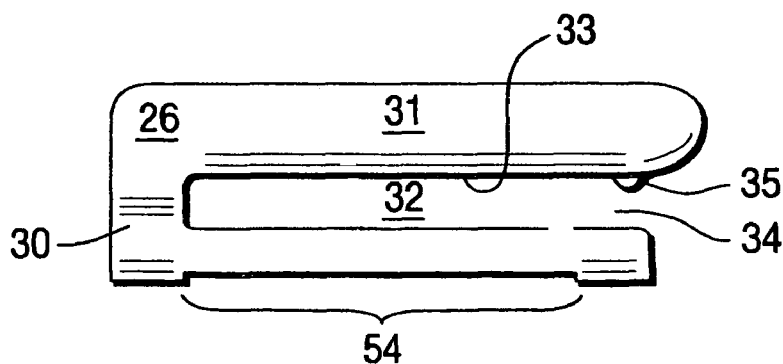
FIG. 8 is a front plan view of an alternative embodiment of the present invention.
Figure 9:
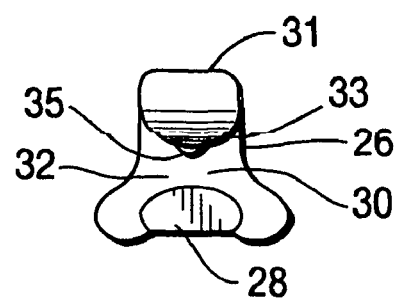
FIG. 9 is a side plan view of the alternative embodiment of the cording restraining means of the present invention shown in FIG. 8.

Another alternative configuration of the present invention is shown in FIGS. 8 and 9 wherein a tab means 35 is included protruding downwardly from the undersurface of the upper leg member 31 of the C-shaped clip member 26 to provide a retaining tab for facilitating guiding of the main strap 36 in proper position within the cinching slot 32. In a preferred configuration as the main strap 36 is tightened by being pulled to the left as shown in FIGS. 1 and 2, it will bear against a tightening edge 33 defined on the undersurface of the upper leg member 31 of the C-shaped clip member 26. By bearing against this surface additional leverage is provided for tightening of the cord encircling section of the main strap 36 about the cording 10 which allows securement of the base engaging means 24 with respect to the strap engaging means 46 to firmly and securely hold the cording 10 within the cording securement zone 42. This tightening of the main strap against the tightening edge 33 is enhanced by the inclusion of the downwardly extending tab 35 since it helps to retain the main strap 36 within the cinching slot 32. Entry of the main strap 36 into the cinching slot 32 is preferably performed through the lateral opening 34 defined therein. This tab means 34 extends downwardly to a limited extent into the lateral opening to facilitate retaining of the main strap 36 within the cinching slot 32 particularly when the main strap 36 is tightened about the cording 10.

To provide additional leverage a handle 56 may be defined on the second strap attaching section 44 at the outermost end thereof in the form of a hem of the flexible material from which the strap is made which provides an increase size for facilitating grasping of the second strap attaching section 44 to aid in pulling thereof through the cinching slot 32.

Mounting of the base member 14 of the present invention with respect to various different shapes, sizes and configurations of tools 12 is enhanced by the defining of a base receiving slot means 54 in the base mounting surface 20 thereof. This base receiving slot 54 facilitates engagement of the lower leg member 28 of the C-shaped clip member 26 with respect to the base member 14 to facilitate attachment thereof with respect to the tool 12 when mounted.

Figure 4:
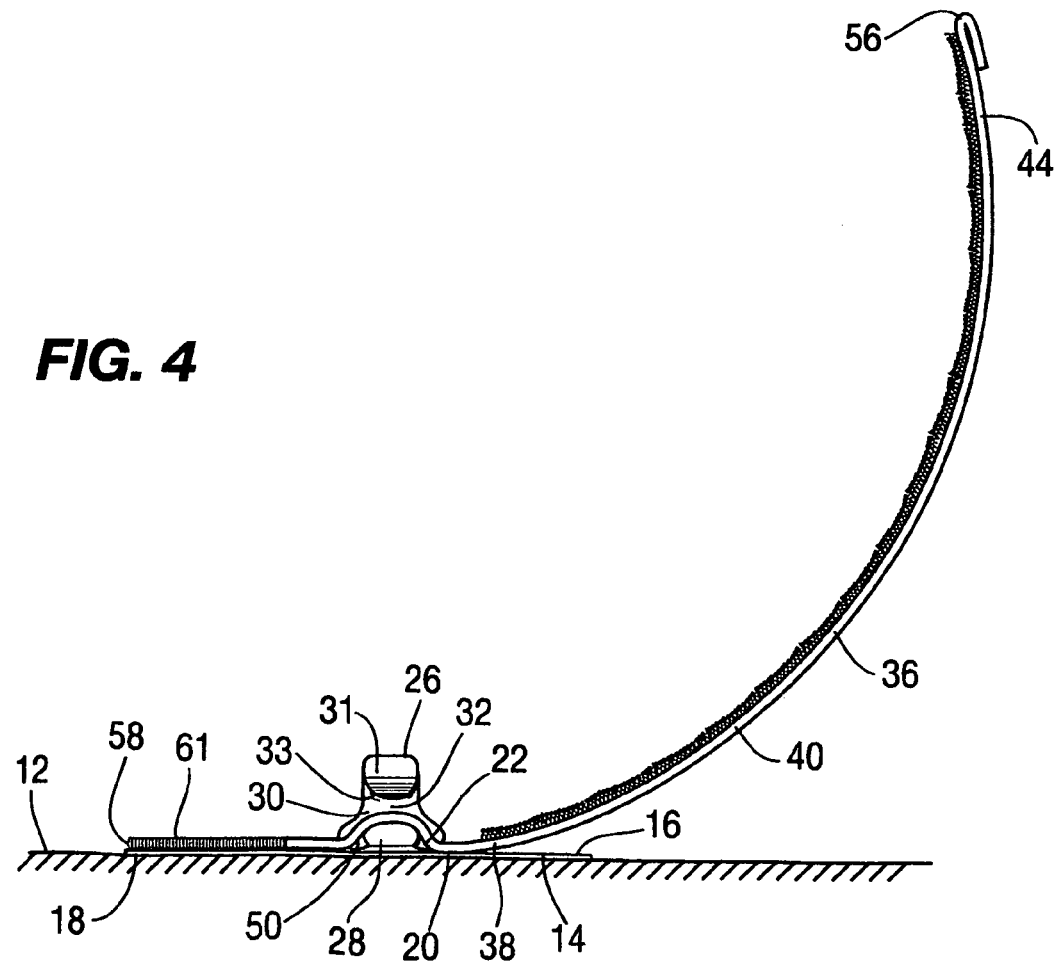
FIG. 4 is a side cross sectional view of an embodiment of the cording restraining means of the present invention shown in the open position prior to securement thereof bundling of cording.
Figure 5:
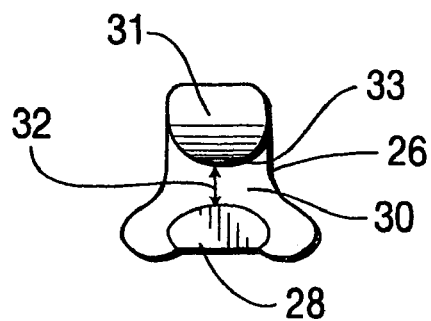
FIG. 5 is a side plan view of an embodiment of the C-shaped clip member of the present invention.
Figure 6:
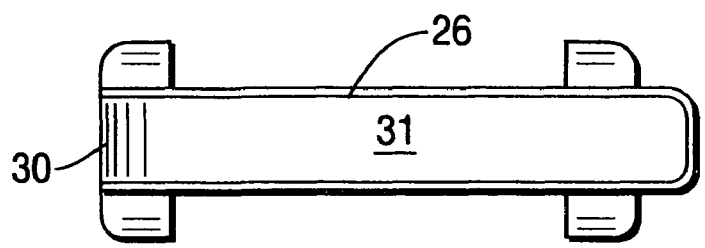
FIG. 6 is a top plan view of an embodiment of the C-shaped clip member of the present invention.

In operation a user will initially open the apparatus of the present invention by extending of the main strap 36 outwardly as shown best in FIG. 4. The cording 10 will then be gathered and placed in abutment with the cord encircling section 40 of the main strap section 36. The main strap 36 will then be guided through the lateral opening 34 into the cinching slot 32. The user will then grasp the handle 56 and pull to the left as shown in FIGS. 1 and 2 thereby tightening of the cord encircling section 40 of the main strap 36 around the cording 10 and slightly compressing thereof. While still compressed the user will then press downwardly with the second strap attaching section 44 of the main strap 36 thereby attaching of the main strap 36 with respect to the base member 14 to hold it in place and retain the cording 10 fully engaged within the cording securement zone 42. Release can easily be achieved by disengaging the first strap attaching section 38 of the main strap 36 from the base engaging means 24 and removing of the main strap 36 from the cinching slot 32 thereby completely releasing the cording 10 for unwinding and usage thereof.

It should be appreciated in the present invention that the base engaging means 24 which is detachably secured with respect to the strap engaging means 46 can be positioned directly on the second base end 18 of the base member 14 or it can be positioned on the base covering flap 48 as shown in FIG. 2 or it can be positioned on the upwardly facing side of the first strap attaching section 38 as shown in FIG. 1. Each of these configurations provides detachable securement of the main strap 36 with respect to the first base end 16 of base member 14 to in this manner affix the main strap 36 in the cinched position extending through the cinching slot 32 and held detachably secured in place to encircle and retain the cording 10 within the cording securement zone 42.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A cording restraining means attachable to a tool comprising:
    A. a base member being attachable with respect to the tool and including;
        (1) a first base end;
        (2) a second base end oppositely positioned from said first base end;
        (3) a base mounting surface positionable in abutment with the tool to which said base member is attached;
        (4) a base restraining surface facing away from said base mounting surface;
        (5) a base engaging means attached with respect to said base restraining surface at a position adjacent said second base end thereof;
    B. a C-shaped clip member including:
        (1) a lower leg member attached with respect to said base member at a position between said first base end and said second base end thereof to facilitate attachment of said C-shaped clip member with respect to the tool responsive to securement of said base member with respect to the tool;
        (2) a spacing member secured to said lower leg member and extending outwardly away therefrom;
        (3) an upper leg member secured to said spacing member at a position spatially disposed from said lower leg member to define therebetween a cinching slot means;
    C. a main strap means secured with respect to said base member adjacent said first base end thereof and positionable extending outwardly away therefrom and being positionable extending through said cinching slot means defined within said C-shaped clip member, said main strap means including;
        (1) a first strap attaching section extending through said cinching slot means and attached with respect to said base member adjacent said first base end thereof;
        (2) a cord encircling section extending outwardly away from said first base attaching section in order to facilitate extending around cording for restraining thereof and being extendable further through said cinching slot means, said cord encircling section of said main strap means and said base member and said C-shaped clip member together defining a cording securement zone means therebetween for facilitating retaining of cording positioned extending therethrough responsive to positioning said cord encircling section of said main strap means extending through said cinching slot means;
        (3) a second strap attaching section secured to said cord encircling section at a position located oppositely thereon from said first attaching section and extending through said cinching slot means; and
        (4) a strap engaging means mounted upon said second strap attaching section which is detachably securable with respect to said base engaging means adjacent said second base end thereof for facilitating detachable attaching of said main strap means with respect to said second base end of said base member in position extending through said cinching slot means while extending around and restraining cording extending through said cording securement zone means, said strap engaging means also being simultaneously and independently engagable with said first strap attaching section of said main strap means for retaining thereof in position extending through said cinching slot means;
    D. an adhesive means positioned upon said base mounting surface of said base member to facilitate attachment thereof with respect to the tool.

2. A cording restraining means attachable to a tool as defined in claim 1 further including a base covering flap means extending over said base member and secured to said first base end thereof and secured to said second base end thereof, said base covering flap means being at least partially spatially disposed from said base member to define a base pocket means therebetween which is adapted to receive said lower leg member of said C-shaped clip member positioned extending therethrough to facilitate attachment thereof with respect to said base member at a position between said first base end and said second base end thereof.

3. A cording restraining means attachable to a tool as defined in claim 2 wherein said first strap attaching section of said main strap means is fixedly secured directly to said base covering flap means adjacent said first base end of said base member to facilitate attachment of said first strap attaching section with respect to said base member adjacent said first base end thereof.

4. A cording restraining means attachable to a tool as defined in claim 2 wherein said base covering flap means is made of a flexible material to facilitate positioning thereof spatially disposed from said base member to facilitate defining of said base pocket means therebetween while being secured to said first base end and said second base end of said base member.

5. A cording restraining means attachable to a tool as defined in claim 1 wherein said main strap means is secured to said first base end of said base member and extends to a position adjacent said second base member for securement therewith also, said main strap means being at least partially spatially disposed from said base member between said first base end and said second base end to define a base pocket means therebetween which is adapted to receive said lower leg member of said C-shaped clip member positioned extending therethrough to facilitate attachment thereof with respect to said base member at a position between said first base end and said second base end thereof.

6. A cording restraining means attachable to a tool as defined in claim 1 wherein said C-shaped clip member defines a lateral opening means extending into said cinching slot means to facilitate positioning of said main strap means therethrough into said cinching slot means for holding thereof in position extending around cording positioned extending through said cording securement zone means.

7. A cording restraining means attachable to a tool as defined in claim 6 wherein said C-shaped clip member includes a tab means extending outwardly from said upper leg member extending at least partially into said lateral opening means to facilitate retaining of said main strap means within said cinching slot means.

8. A cording restraining means attachable to a tool as defined in claim 1 wherein said upper leg member extends approximately parallel with respect to said lower leg member such that said cinching slot means is generally rectangular in cross-section.

9. A cording restraining means attachable to a tool as defined in claim 1 wherein said C-shaped clip member is flexibly resilient to facilitate tightening of said main strap means when positioned within said cinching slot means while extending around and retaining of cording extending through said cording securement zone means thereadjacent.

10. A cording restraining means attachable to a tool as defined in claim 1 wherein said main strap means is made of a flexible material to facilitate positioning thereof extending through said cinching slot means and to facilitate extending thereof around cording extending through said cording securement zone means thereadjacent for retaining thereof.

11. A cording restraining means attachable to a tool as defined in claim 1 wherein said upper leg member of said C-shaped clip member includes a tightening edge defined thereon immediately adjacent said cinching slot means against which said main strap means can bear to facilitate tightening of said main strap means around the cording positioned extending through said cording securement zone means.

12. A cording restraining means attachable to a tool as defined in claim 1 wherein said lower leg member of said C-shaped clip means defines a base receiving slot means therewithin facing away from said cinching slot means which is adapted to at least partially receive said base member extending thereinto in order to facilitate attachment thereof with respect to said base member.

13. A cording restraining means attachable to a tool as defined in claim 1 wherein said second strap attaching section of said main strap means includes a handle means for enhancing grasping thereof for facilitating guiding of said main strap means into said cinching slot means and to facilitate tightening of said main strap means around cording positioned within said cording securement zone means.

14. A cording restraining means attachable to a tool as defined in claim 13 wherein said main strap means is made of a flexible material and wherein said handle means comprises a hem means formed in said main strap means.

15. A cording restraining means attachable to a tool as defined in claim 1 wherein said base engaging means comprises a base hook and loop securement means and wherein said strap engaging means comprises a strap hook and loop securement means, said strap hook and loop securement means being detachably engageable with respect to said base hook and loop securement means.

16. A cording restraining means attachable to a tool as defined in claim 15 wherein said base hook and loop securement means specifically comprises a base hook securement means and wherein said strap hook and loop securement means specifically comprises a strap loop securement means.

17. A cording restraining means attachable to a tool as defined in claim 15 wherein said base hook and loop securement means specifically comprises a base loop securement means and wherein said strap hook and loop securement means specifically comprises a strap hook securement means.

* * * * *